No. 609,772. Patented Aug. 30, 1898.
A. BEVER.
VALVE GEAR.
(Application filed May 19, 1897.)
(No Model.) 3 Sheets—Sheet 1.
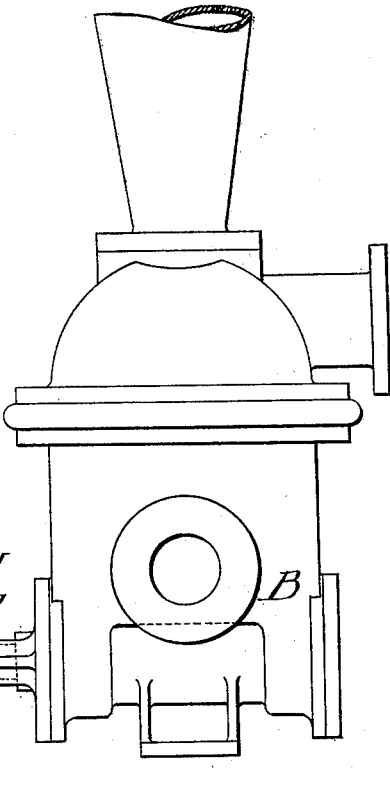
Fig. 1.
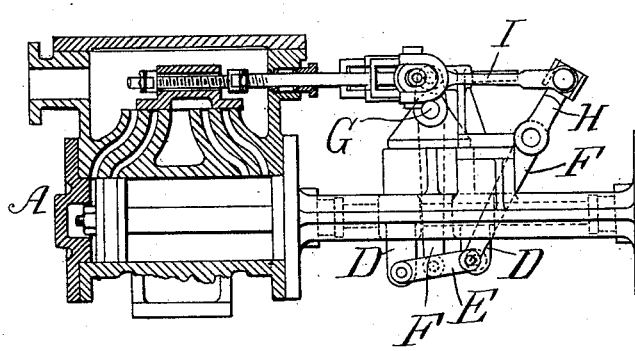
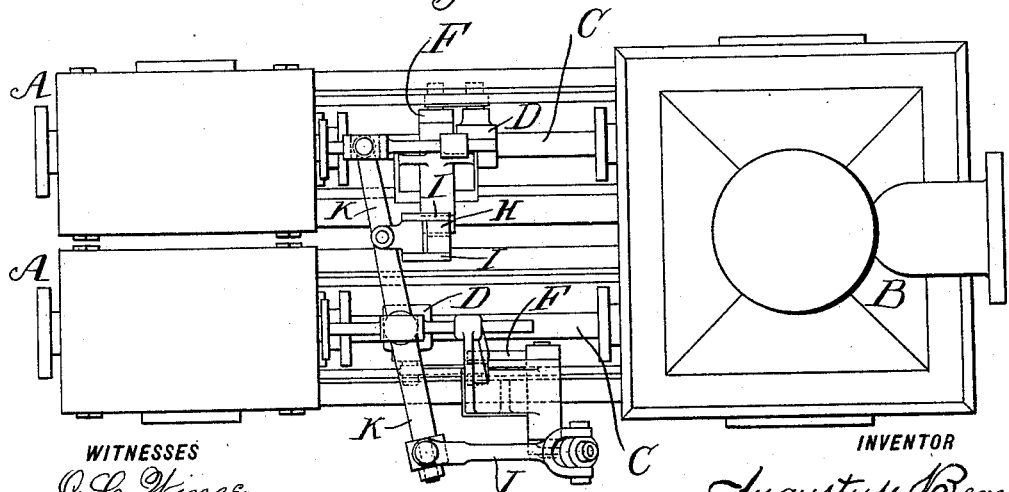
Fig. 2.
WITNESSES
O. C. Wing
M. G. McLean
INVENTOR
Augustus Bever,
BY
Clark Deemer & Co
ATTORNEYS No. 609,772. Patented Aug. 30, 1898.
A. BEVER.
VALVE GEAR.
(Application filed May 19, 1897.)
(No Model.) 3 Sheets—Sheet 2.
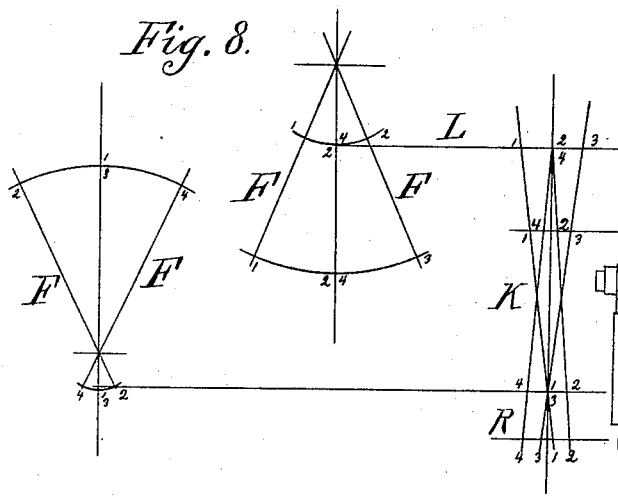
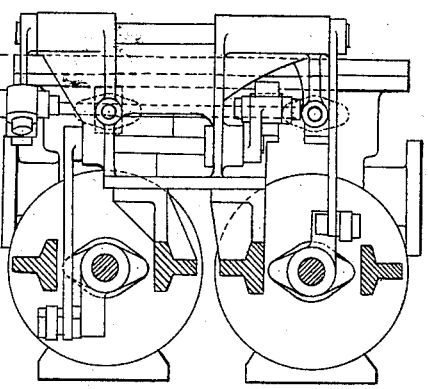
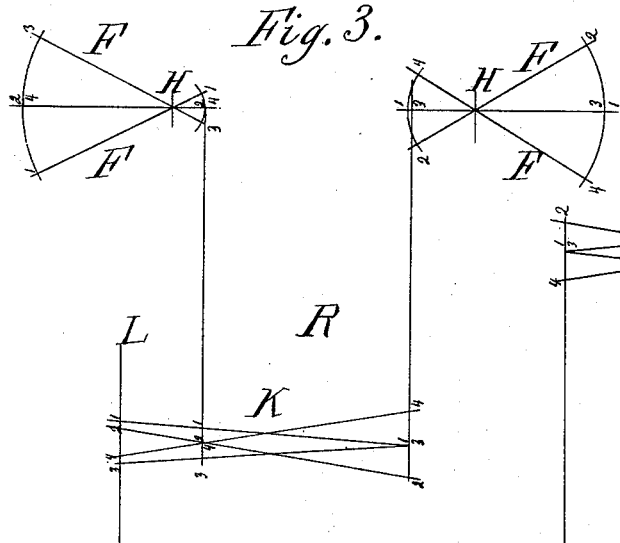
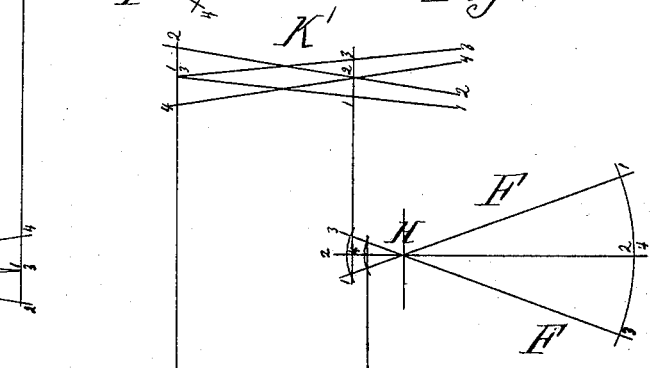
WITNESSES
INVENTOR
Augustus Bever,
BY
Clark Deemer & Co.
ATTORNEYS No. 609,772. Patented Aug. 30, 1898.
A. BEVER.
VALVE GEAR.
(Application filed May 19, 1897.)
(No Model.) 3 Sheets—Sheet 3.

WITNESSES
O. C. Winge.
M. H. McLean.

INVENTOR
Augustus Bever,
BY
Clark Deemer & Co
ATTORNEYS

THE NORRIS PETERS CO., PHOTO-LITHO., WASHINGTON, D. C.

UNITED STATES PATENT OFFICE.

AUGUSTUS BEVER, OF DEWSBURY, ENGLAND.

VALVE-GEAR.

SPECIFICATION forming part of Letters Patent No. 609,772, dated August 30, 1898.

Application filed May 19, 1897. Serial No. 637,227. (No model.) Patented in England April 10, 1894, No. 7,074.

*To all whom it may concern:*

Be it known that I, AUGUSTUS BEVER, a subject of the Queen of Great Britain, and a resident of Northgate, Dewsbury, county of York, England, have invented certain new and useful Improvements in Valve-Gears, (for which I have obtained English patent, dated April 10, 1894, No. 7,074,) of which the following is a specification, reference being had to the accompanying drawings, forming a part thereof, in which similar letters of reference indicate corresponding parts.

My invention of improvements in the arrangement and construction of valve-gears for duplex engines consists in coupling the two valve-spindles belonging to the two steam-cylinders together by means of a vibrating beam or lever or by means of a combination of levers usually placed horizontally, and in coupling this lever or these levers to the two levers worked from the piston-rod cross-heads, as in ordinary duplex pumping-engines, thus obtaining a motion of the valve-spindles which is a combination of the motions of the two cross-heads. Under certain circumstances, which vary according to the lengths of stroke of the piston-rods and valve-spindles and the distance of centers of cylinders, I find it more convenient to have one lever for each valve-spindle and couple each such lever to the two piston-rods to obtain the desired combined motion.

In order to enable my invention to be thoroughly understood, I will describe the same with reference to the accompanying drawings, in which—

Figure 5:
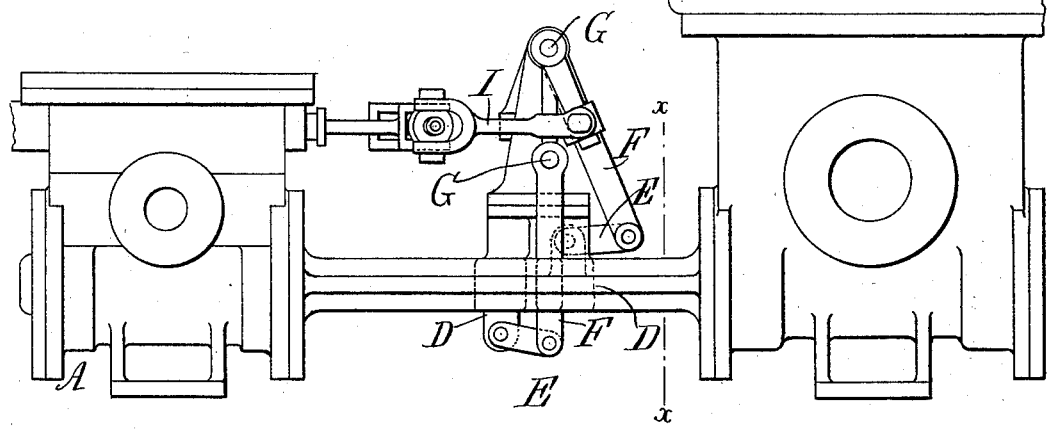
Figure 6:
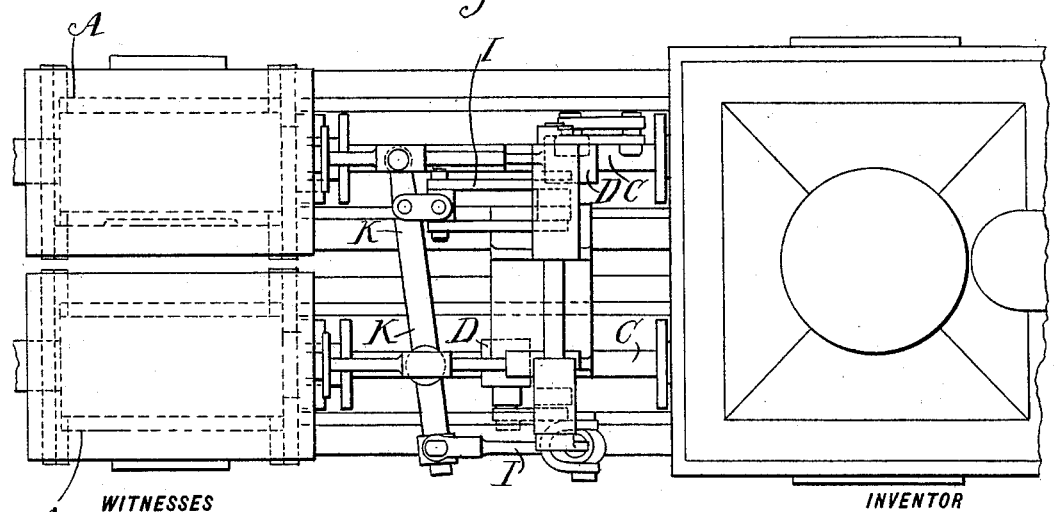

Figure 1 is an elevation, partly in section. Fig. 2 is a plan of a duplex pumping-engine fitted with the improved valve-gear. Figs. 3 and 4 are diagrams to explain the motion and arrangement of this gear. Fig. 5 is a side elevation of a modified form of gear. Fig. 6 is a plan view thereof. Fig. 7 is a sectional end view, and Fig. 8 is a diagram thereof.

Referring to the drawings, A A are the steam-cylinders.

B is the casting containing the two pumps, one being worked by a rod from each of the steam-cylinders.

C C are the piston-rods connecting the pistons of the steam-cylinders with those of the pumps. On these piston-rods are two small cross-heads or brackets D D, which are fixed on the rods and reciprocate with the rods. These are connected by means of short links E E to swinging levers F F, working on the centers G G, and on these centers are also keyed the short levers H H, which are connected by means of links I I to the vibrating lever K K. This lever will therefore have a compound motion which is a combination of the motion of both piston-rods.

The lever K K is coupled to the two valve-spindles, as shown. By this arrangement the slide-valve of each cylinder has its motion imparted to it by the piston-rod of the other cylinder, but the motion is controlled and regulated by that of its own piston. To describe further the motion of this valve-gear, I will refer to the diagram.

Fig. 3 is a diagram of a similar gear to that shown in Figs. 1 and 2, Fig. 4 being a diagram of a gear in which two vibrating levers are used, one for each valve-spindle. In these diagrams the swinging levers F F are, for the sake of simplicity, shown in the same plane as the vibrating levers. L and R are the centers of the two valve-spindles. When the engine is working under normal condition, the piston of one cylinder is at the end of its stroke when the piston of the other cylinder is at half-stroke, so that if the piston on the side marked L is in position marked 1, or at the inside end of its stroke, the piston on the R side will be also in position marked 1, or at half-stroke, and the corresponding position of the vibrating lever is also marked 1, and it will be seen that the slide-valve on the side marked L is in its extreme forward position. As the piston L moves from 1 to 2 or half-stroke the valve-spindle is pushed back to close the back steam-port; but although the piston travels through half the length of its stroke the valve-spindle only travels a short way on account of the motion being counteracted by the motion of the piston on the other side. Afterward in the second half of the stroke the motion of the piston R assists the piston L in moving the valve, so that while the piston travels from 2 to 3 the valve is pushed from position 2 right over to the full backward position, (marked 3.) This action repeats itself in the next stroke and also in the valve on the side R. In the gear shown in Fig. 4 the action is similar; but a separate vibrating lever is supplied for each cylinder, the lever K' being connected to the valve-spindle on side R and the lever K'' to the valve-spindle on side L, each lever being connected with both the swinging levers F F and H H, as shown in the accompanying diagram. Figs. 5, 6, 7, and 8 show a slightly different arrangement of said gear. In Fig. 8 it will be seen that each valve-spindle is worked more particularly by the piston-rod of the other side and that the motion is only modified to a smaller extent by the piston-rod of its own side sufficiently to give lead and cut off the steam before the end of the stroke. On the other hand, in Fig. 3 each valve-spindle is worked chiefly by its own piston-rod and only to a smaller extent by the other piston-rod, with the object of retarding the motion of the valve.

The object of this invention is to obtain an improved motion in the slide-valves of duplex pumps which will enable me to work these pumps at a high piston-speed, also to work them with an early cut off of steam and to obtain an arrangement which will cause the motion of one cylinder to govern that of the other by cutting off the steam earlier if it gets in advance of its proper position.

Having thus described my invention, what I claim as new, and desire to secure by Letters Patent, is—

A duplex engine for pumping or other purposes, comprising two steam-cylinders with their respective steam chests, valves, pistons and piston-rods, and valve-gears embodying two spindles operated by means of a vibrating lever pivotally connected with two swinging levers worked by the said piston-rods, said valve-gear being adjusted to admit steam to and cut steam off from their respective cylinders in such a manner that one piston shall lead the other one-half stroke, substantially as shown and described.

In testimony that I claim the foregoing as my invention I have signed my name, in presence of the subscribing witnesses, this 4th day of May, 1897.

AUGUSTUS BEVER.

Witnesses:
 CHAS. GILLIARD,
 WM. A. BAINES.